United States Patent [19]

Mueller

[11] Patent Number: 4,819,598
[45] Date of Patent: Apr. 11, 1989

[54] METHOD AND APPARATUS FOR PREVENTING TROUBLESOME LOAD CHANGE SHOCKS CAUSED BY A COMBUSTION ENGINE

[75] Inventor: Eckart Mueller, Gifhorn, Fed. Rep. of Germany

[73] Assignee: Volkswagen AG, Wolfsburg, Fed. Rep. of Germany

[21] Appl. No.: 123,962

[22] Filed: Nov. 23, 1987

[30] Foreign Application Priority Data

Nov. 27, 1986 [DE] Fed. Rep. of Germany ....... 3640536

[51] Int. Cl.$^4$ ................................................ F02D 9/08
[52] U.S. Cl. ..................................... 123/399; 123/361
[58] Field of Search ............... 123/361, 399, 357, 371, 123/419, 436

[56] References Cited

U.S. PATENT DOCUMENTS

| 3,692,007 | 9/1972 | Nilsseu | 123/399 |
| 4,328,777 | 5/1982 | Yasuhara | 123/371 X |
| 4,368,706 | 1/1983 | Yasuhara | 123/371 X |
| 4,377,998 | 3/1983 | Härtel et al. | 123/419 X |
| 4,527,523 | 7/1985 | Däumer et al. | 123/436 X |
| 4,543,933 | 10/1985 | Kessler et al. | 123/361 |
| 4,569,320 | 2/1986 | Collonia | 123/399 |
| 4,599,980 | 7/1986 | Collonia | 123/436 X |
| 4,635,601 | 1/1987 | Cornelius | 123/436 X |
| 4,640,243 | 2/1987 | Abo et al. | 123/399 |

FOREIGN PATENT DOCUMENTS 0029750 2/1984 Japan .................................. 123/399

Primary Examiner—Tony M. Argenbright
Assistant Examiner—Eric R. Carlberg
Attorney, Agent, or Firm—Brumbaugh, Graves, Donohue & Raymond

[57] ABSTRACT

A method and apparatus for preventing troublesome load change shocks caused by a combustion engine having a time delay in the transmission of the accelerator pedal commands to the output control element. In order to exclude undesirable influences on operation due to the time delay, the time delay is limited to a very narrow region around the location zero of the torque gradient in relation to time.

6 Claims, 1 Drawing Sheet

METHOD AND APPARATUS FOR PREVENTING TROUBLESOME LOAD CHANGE SHOCKS CAUSED BY A COMBUSTION ENGINE

BACKGROUND OF THE INVENTION

The present invention relates to an apparatus for preventing troublesome load change shocks caused by a combustion engine used to propel a vehicle, whereby control commands for a power control element delivered by an accelerator pedal are transmitted with a time delay. An apparatus constructed in such a fashion is described in EP No. 0,155,993 F 02 D 11/10. By delaying the transmission of the control commands, a flattening or lengthening of the rise and fall times occurs.

It is known that in the case of automobiles with internal combustion engines, a so-called load change shock occurs during a change in load, i.e., on transition from engine braking to traction. Such a shock possibly leads to longitudinal vibrations of the vehicle otherwise known as jerking. This often occurs at low speeds of the internal combustion engine This phenomenon is determined essentially by the kinetic energy of the combustion engine and the drive train which, due to elasticities and clearances in the drive train, is set free and is partially transmitted to the vehicle's body during the load change. Therefore, the undesirable load change phenomena can be largely prevented if the kinetic energy built up during the load change is reduced to a minimum This occurs also in accordance with the state of the art cited, whereby the delayed transmission of the control command delivered by the accelerator pedal to the control element, e.g., a throttle valve or a control rod of an injection device, is limited to approximately 50% of the control range so that the operator, if necessary, can undertake a rapid acceleration of the vehicle.

From this would follow that the delay per se in the transmission of the accelerator pedal command would be undesirable. However, according to the state of the art it must be accepted within a relatively large control range in order to avoid or diminish to a tolerable measure the even more undesirable longitudinal dynamic instabilities of the vehicle.

SUMMARY OF THE INVENTION

It is the object of the present invention to provide a method and an apparatus which reduce the undesirable load change phenomena to an extent which is at least not troublesome, without the need to accept as a consequence disturbing delays in the transmission of the accelerator pedal commands to the power control element.

Accordingly, the time delay in the transmission of the accelerator pedal command to the power control element is limited to a very narrow region of the course in time of the torque gradient of the internal combustion engine, which takes into account the fact that essentially only the inversion in the sign of the torque on transition from engine braking to traction and vice versa is responsible for the load change shock.

BRIEF DESCRIPTION OF THE DRAWINGS

The invention will be more fully explained in the following description of the preferred embodiment, as represented in the accompanying drawings, in which.

DETAILED DESCRIPTION OF THE PREFERRED EMBODIMENT

Figure 1:
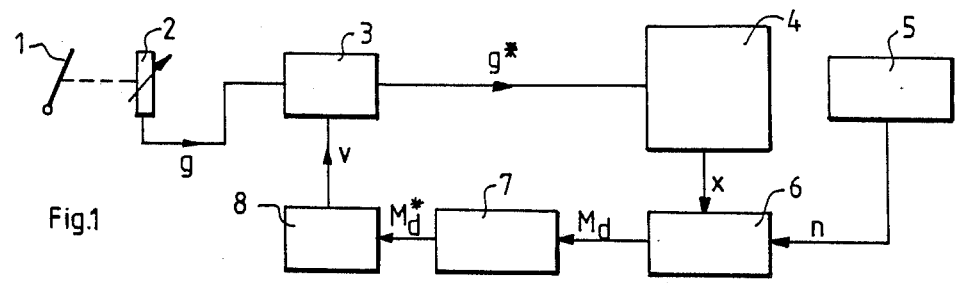
FIG. 1 is a circuit diagram for the preferred embodiment of the apparatus pursuant to the present invention.

The apparatus for preventing troublesome load change shocks illustrated in FIG. 1 is designed with an accelerator pedal 1 which acts on a potentiometer 2 which delivers an electric accelerator pedal signal g corresponding to the position of the accelerator pedal 1 to the coupling element 3. The signal g* produced by the coupling element 3, and to be described below, reaches a device 4 which, on the one hand, converts the electric signal g* into an actuating signal for a power control element of the internal combusion engine, e.g., a throttle valve or a control device of a fuel injection system, and, on the other hand, delivers by means of a position sensor on the power control element, a position signal x.

Both the position signal x and engine speed signal n, produced by means of an engine speed sensor 5 which measures the number of revolutions of the internal combusion engine, and possibly also an ignition angle signal, actuate the performance characteristic storage 6 in which is stored the gradient of the torque $M_d$ of the combustion engine as a function of the aforementioned quantities. The torque signal $M_d$, thus called up, arrives at the amplitude window circuit 7, which is designed in such a manner that it permits only torque signals $M_d*$ to reach a time delay signal generator 8. The torque signals occupy a very narrow region of the torque gradient of the combustion engine where torque passage is zero. For example, this region, which represents the amplitude window produced by the device 7, may be limited on the positive side and on the negative side by the torque signal for one tenth of the maximum torque of the combustion engine. Only if the torque signal $M_d$ is placed between these limit values will the amplitude window circuit 7 deliver a signal $M_d*$ triggering the time delay signal generator 8, whereafter the device 8, which contains a differentiating device, will deliver a time delay signal v to the coupling element 3. The time delay signal can be dimensioned advantageously in such a manner that in the case of torque signals within the amplitude window, i.e., in the direct vicinity of the torque gradient where torque pasage is zero, the increase in the control command of the accelerator pedal 1 is flattened within a small region and thereby lengthened by 0.03 to 0.5 seconds. Accordingly, the full effect of the accelerator pedal g is delayed. These "rise-extended" accelerator pedal signals are indicated in FIG. 1 by g*. As will be explained by the additional figures, the time delay within the aforementioned amplitude window can be imparted a non-linear course in time by simple means.

Figure 2:
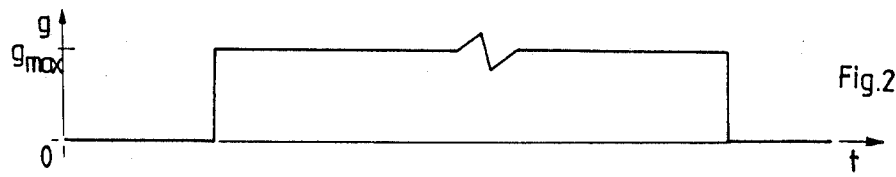
FIGS. 2-5 are diagrams showing torque gradients and their application according to the invention.

Viewing the further figures, we find that FIG. 2 shows the course of the accelerator pedal signal g over the time t with $g_{max}$ indicating the full kick-down position of the accelerator pedal. We can see that very rapid accelerator pedal actuation is assumed here which results in a practically rectangular course, over time, for the signal g.

Figure 3:
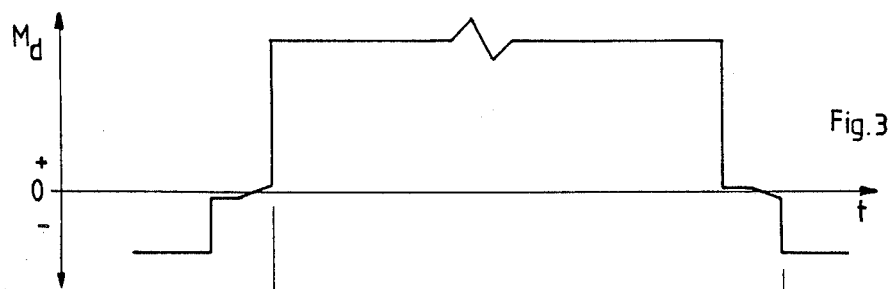
Figure 4:
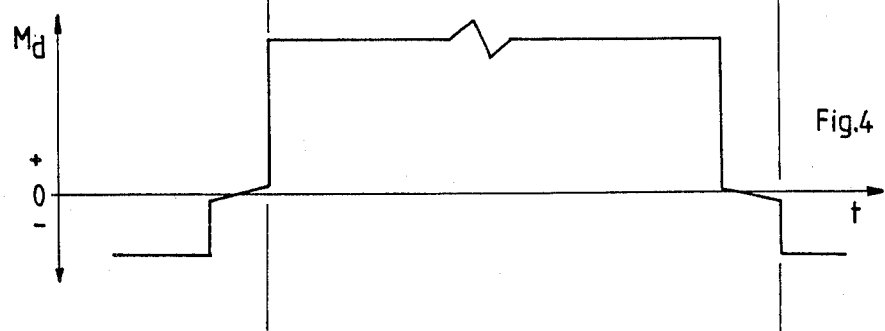
Figure 5:
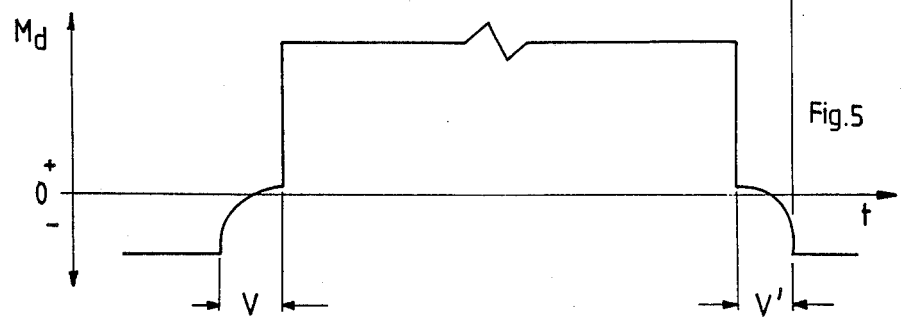

In FIGS. 3, 4 and 5 it has been assumed that the accelerator pedal actuation described with reference to FIG. 2 serves the transition from engine braking (with negative values of the torque $M_d$) to normal traction of the internal combustion engine (with positive torque values). The method according to the present invention operates such that a time delay signal is generated only in the immediate vicinity of the torque gradient where torque passage is zero. Therefore, as the torque increases, only a very small (short-time) time delay region V is present in the torque increase. Directly after the vicinity where torque passage is zero, the torque gradient rises very steeply and corresponds to the steep rise of the gas pedal signal g.

The curves in FIGS. 3, 4 and 5 differ with respect to the gradient of the torque curve within the time delay region V. FIG. 3 illustrates a gradient combined of two straight lines with different rises. In FIG. 4, said gradient follows a straight line. On depression of the accelerator pedal, there initially occurs in both embodiments, a steep torque increase to a value directly below zero, which is initially maintained in FIG. 3. In FIG. 4 this is directly followed by a linear increase with a very small rise.

In the embodiment as per FIG. 5, the torque increase occurs within the region V in a non-linear manner, initially with a relatively large rise which decreases increasingly. In this case, too, it is ensured that directly following transit through the vicinity where torque passage is zero, the torque gradient assumes a steep rise.

In FIGS. 3, 4 and 5 it is assumed that the corresponding time delay regions V' are passed during the transition from traction to engine braking. These regions are mirror images of the rise regions V so that they need not be further discussed. Evidently, it is also possible to render the torque gradient within the regions V and V' different for each case.

All of the described embodiments offer the advantage that the time delays or flattenings of the torque increase, which serves the elimination or considerable reduction of load change phenomena, are limited to that region of the torque gradient of the internal combustion engine which is responsible for the phenomena. Outside this very narrow time range, transmission of the accelerator pedal command to the pertinent output control element occurs without delay.

While the invention has been illustrated and described as embodied in an apparatus for preventing troublesome load change shocks caused by a combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for preventing troublesome load change shocks caused by a combustion engine used to propel a vehicle, the method comprising the step of transmitting with a time delay control commands for a power control element which are delivered by an accelerator pedal, said time delay being limited to a region of the torque curve of the engine where the torque changes between positive and negative values.

2. An apparatus for preventing load change shocks of a combustion engine used to propel a vehicle by transmitting, with a time delay, control commands for a power control element, the time delay being limited to a region of the torque curve of the engine where the torque changes between positive and negative values, the apparatus comprising; means for delivering the control commands to the power control element; a torque signal generator; a time delay signal generator; and amplitude window circuit means provided between said torque signal generator.

3. An apparatus as defined in claim 2, wherein said amplitude window circuit means has a pass range of approximately $0.1\ M_{d\ max} \geq M_d \geq -0.1\ M_{d\ max}$, $M_d$ being a prevailing torque signal and $M_{d\ max}$ being a torque signal at maximum torque of the combustion engine.

4. An apparatus as defined in claim 2, wherein said time delay signal generator is designed for delays ranging from approximately 0.03 to 0.5 seconds.

5. An apparatus as defined in claim 2, wherein the torque signal generator is provided so as to serve as a performance characteristic storage which is actuated by way of sensors.

6. An apparatus for preventing troublesome load change shocks caused by a combustion engine used to propel a vehicle comprising; a power control element for the vehicle; an accelerator pedal provided so as to deliver a control command to said power control element, said control command being transmitted with a time delay; and means for limiting the time delay to a region of the torque curve of the engine where torque changes between positive and negative values.

* * * * *